United States Patent
Finn et al.

(10) Patent No.: US 9,422,506 B2
(45) Date of Patent: Aug. 23, 2016

(54) DEWAXING

(75) Inventors: Andrew Finn, Cincinnati, OH (US); Alan Gabelman, West Chester, OH (US)

(73) Assignee: Givaudan, S.A., Vernier (CH)

(*) Notice: Subject to any disclaimer, the term of this patent is extended or adjusted under 35 U.S.C. 154(b) by 1478 days.

(21) Appl. No.: 12/207,481

(22) Filed: Sep. 9, 2008

(65) Prior Publication Data

US 2009/0074941 A1  Mar. 19, 2009

Related U.S. Application Data

(60) Provisional application No. 60/993,685, filed on Sep. 13, 2007.

(51) Int. Cl.
| | | |
|---|---|---|
| *A23L 1/222* | (2006.01) | |
| *C12C 7/16* | (2006.01) | |
| *C12G 1/08* | (2006.01) | |
| *C12H 1/08* | (2006.01) | |
| *C11B 9/02* | (2006.01) | |

(52) U.S. Cl.
CPC .............. C11B 9/022 (2013.01); *A23L 1/2225* (2013.01)

(58) Field of Classification Search
CPC ... A23L 1/2225; A23L 1/221; A23L 1/22008; A23L 1/2215; A23L 2/70; C11B 9/022; A23B 5/00; A23J 1/08; B01D 29/01; A01J 25/112
USPC .................................................. 426/651, 495
See application file for complete search history.

(56) References Cited

U.S. PATENT DOCUMENTS

| | | | | |
|---|---|---|---|---|
| 2,863,861 | A | * 12/1958 | Platt | 426/651 |
| 2,938,028 | A | 5/1960 | Platt et al. | |
| 3,155,648 | A | * 11/1964 | Swisher | 426/651 |
| 3,915,960 | A | 10/1975 | Jefferson et al. | |
| 5,006,253 | A | * 4/1991 | Slegers | 210/636 |
| 5,066,504 | A | * 11/1991 | Asbeck et al. | 426/417 |
| 5,362,714 | A | * 11/1994 | Radford et al. | 512/5 |
| 5,482,633 | A | * 1/1996 | Muraldihara et al. | 210/651 |
| 7,122,218 | B2 | 10/2006 | Yamamoto et al. | |
| 2003/0157240 | A1 | 8/2003 | Yamamoto et al. | |

FOREIGN PATENT DOCUMENTS

| | | | |
|---|---|---|---|
| EP | 182396 A2 | * 5/1986 | |
| EP | 1 334 665 A1 | 8/2003 | |
| WO | WO 0202213 A1 | * 1/2002 | |

OTHER PUBLICATIONS

Fuma, "Microfiltration", Oct. 2006, retrieved from the Internet: http://web.archive.org/web/20061021033924/http://www.fumatech.com/En/Membrane-technology/Membraneprocesses/Microfiltration/.*

PCT/CH2008/000378—International Search Report, Dec. 22, 2008.

* cited by examiner

*Primary Examiner* — Jill Warden
*Assistant Examiner* — Tynesha McClain-Coleman
(74) *Attorney, Agent, or Firm* — Curatolo Sidoti Co., LPA; Joseph G. Curatolo; Salvatore A. Sidoti

(57) ABSTRACT

A method of dewaxing a citrus oil by subjecting the oil to a filtration process, in which the oil is caused to flow parallel to a porous membrane during which process it is maintained at a temperature of less than about 11° C., said membrane having an average pore size of from about 0.05-5 micrometers. The method produces citrus oils that are dewaxed to an unusually high extent.

7 Claims, No Drawings

DEWAXING

CROSS REFERENCE TO RELATED APPLICATIONS

This application claims the benefit of the filing date, under 35 U.S.C. §119(e), from U.S. Provisional Application No. 60/993,685 filed Sep. 13, 2007, which is incorporated herein by reference as if written out below.

This disclosure relates to the dewaxing of citrus oils and to a method of achieving this.

It is desirable to dewax natural oils in order to avoid the formation of precipitate in finished citrus-based products, and there have been described a number of methods for the dewaxing of vegetable oils. These include filtration through one of the variety of porous membranes available on the market, typically porous ceramic or polymeric membranes, and such methods have produced good results.

One test that is carried out in industry to check the efficiency of dewaxing is the cooling test, in which a sample of the dewaxed material is allowed to stand at 4° C. for a prolonged period. There is no standard period, but 48 hours is a useful time. In the case of citrus oils, there is often a good result, but not always. In some cases, there is a visibly turbid solution or some precipitate at the end of the 48 hours, indicating that a substantial amount of wax remains. In addition, samples may pass the 48 hour test immediately after production, but when tested a few weeks later they may fail. This generally means that additional processing is needed, which adds to the expense of the processing. In addition, the fact that a good result cannot be guaranteed with citrus oils introduces uncertainties into the whole process.

It has now been found that this problem can be substantially or even completely overcome by a particular method. There is therefore provided a method of dewaxing a citrus oil by subjecting the oil to a filtration process, in which the oil is caused to flow parallel to a porous membrane during which process it is maintained at a temperature of less than about 11° C., said membrane having an average pore size of from about 0.05-5 micrometers.

There is additionally provided a substantially wax-free citrus oil, prepared by a process as hereinabove described.

By "citrus oil" is meant any oil derived from any of the citrus family of fruits, such as orange, lemon, lime, tangerine, grapefruit and bergamot.

The filtration process involves causing the oil to flow (without limitation, such as by pumping) parallel to a porous membrane surface, as opposed to the more usual so-called "dead end" filtration method, in which the flow is perpendicular to the filtration surface.

By "about 11° C." is meant that this temperature does not represent a sharp cut-off between what works and what does not. Citrus oils are complex mixtures of materials, the natures and proportions of which often differ, depending on source. Thus, although there may be oils that will give good results above 11° C., the incidence of failure increases sharply as 11° C. is approached, and the majority of citrus oils will fail above 11° C. The choice of 11° C. therefore represents the results of practical observation and a slight temperature variation above 11° C. is, for the purposes of this disclosure, considered to lie within its scope.

Suitable membranes that are able to withstand the physical and chemical rigors of the application are well known in the art and are readily available. Some typical types include membranes of metal, ceramic, graphite or polymeric materials, which may be self-supporting or deposited on a support. Examples of the latter type include metals, ceramics and polymers on ceramic supports, zirconia on a graphite support, titanium dioxide on a stainless support or polymer on a support of the same or a different polymer. Well-known commercial products include the FICL filter of Doulton USA and the Membralox™ membranes of Pall Corp., USA.

All such membranes and any associated supporting apparatus are generally available in modular form for easy installation and replacement.

Pumps for use with such a filter are well known to the art, and a suitable pump can readily be selected from any of the commercially-available pumps known to the art.

The pressure causing the oil to flow through the filter may be provided by the pump. This creates a pressure on the feed or "retentate" side of the membrane, and if this is greater than the pressure on the product or "permeate" side, the oil will flow through the membrane. Appropriate pressures to give optimal flux may be determined in each case by simple experimentation.

The average pore size may be between about 0.05 and about 5 micrometers. Particular examples have average pore sizes between about 0.2 and about 3 micrometers, and between about 0.2 and about 1.4 micrometers. The provision of a suitable degree of porosity in any selected membrane material is well within the skill of the art.

The oil is caused to flow parallel to the membrane at a relatively high linear velocity. The skilled person can determine a suitable linear velocity by simple experimentation, but as a general (but by no means rigidly binding) rule, a typical linear velocity is one of from about 1 to about 7 m/s. Thus, the linear velocity for polymer membranes is typically from about 1 to about 2 m/s, and ceramic membranes are typically operated at about 4 to about 7 m/s.

The method hereinabove described allows the recovery of a dewaxed citrus oil that not only passes the 48 hour test hereinabove mentioned immediately after production, but also will pass the same test if left for days, or even months.

The method is now further described with reference to the following non-limiting examples that describe particular embodiments.

EXAMPLE 1

Filtration of Ten Fold Orange Oil

The oil is ten-fold orange oil, produced by distillation from single fold Valencia oil. Folded orange oil is the concentrated product obtained from the removal of bulk terpenes from peel oil via distillation, which concentrates the desired flavor compounds.

The membrane element used was tubular and contained a ceramic ($\alpha$-alumina) membrane coated onto an $\alpha$-alumina support. The pore diameter was 0.2 µm. The element had an inside diameter of 7 mm, outside diameter of 10 mm, and length of 25 cm. This membrane element lit into a housing to form a filtration module, which in turn was fitted into a Pall T1-70 benchtop crossflow microfiltration unit (Pall, East Hills, N.Y., USA). The membrane used was a Membralox® membrane (ex Pall, East Hills, N.Y., USA).

The filtration unit comprised a one-gallon jacketed feed/retentate tank, a circulation pump with a variable frequency drive, the membrane module with inlet and outlet ports, module inlet and outlet pressure gauges, and a module outlet temperature gauge. The permeate line was equipped with a permeate valve, which can shut off the flow. The apparatus was also equipped with a backpulse device, which periodically directs a pulse of permeate through the membrane opposite the normal direction of flow, to minimize membrane fouling.

2500 g of ten fold orange oil was added to the feed tank, then the oil was chilled to −10° C. by circulating propylene glycol/water at −16° C. through the tank jacket. The permeate valve was closed, the tank was pressurized with air, and the circulation pump was started. The air pressure was adjusted to obtain a module inlet pressure of 0.90 bar and an outlet pressure of 0.70 bar. The permeate valve was then opened to begin collection of wax-free orange oil. The module outlet temperature was maintained between 5° C. and 11° C. and the filtered oil collected was subjected to a 48-hour chilled wax test, which it passed.

This test was performed as follows. A sample of filtered oil was incubated in a refrigerator at 4° C. for 48 hours. The sample was then visually inspected for the presence of precipitate. The oil was considered to have passed the test when it remained clear, with no solids present.

During the filtration, the average flux of oil through the membrane was 8 l/m$^2$/hr and the resulting yield was 84.5% (wt/wt) filtered oil per oil feed charged to the system.

EXAMPLE 2

Filtration of Ten Fold Orange Oil Depending on the Temperature

The filtration was performed utilising the apparatus as described in example 1, with some modifications in the method as detailed hereinafter. In this case, to determine the temperature at which the filtered oil would no longer pass the 48-hour wax test due to incomplete removal of the wax, the temperature was allowed to rise above 11° C. as the added heat from the pump increased the temperature of the oil.

2190 g of ten-fold orange oil was charged to the feed tank and chilled to 0° C. using −13° C. propylene glycol/water. The inlet pressure to the membrane module was 0.85 bar and the membrane module outlet pressure was 0.65 bar.

The module outlet temperature was monitored and collection of the filtered oil product started when the module outlet temperature became 8.7° C. and was stopped when it reached 12° C. During filtration, an average flux of 9 l/m$^2$/hr was observed along with a yield of 87% (wt/wt) filtered oil per oil feed charged to the system.

Filtered oil samples were collected throughout the course of the filtration at varying module outlet temperatures, and the samples were subjected to the 48-hour chilled wax test. The results obtained are set out in the following table:

| Module outlet temperature | 48 h wax test |
| --- | --- |
| 8.7° C. | passed |
| 9.5° C. | passed |
| 10° C. | passed |
| 10.4° C. | passed |
| 10.6° C. | passed |
| 11° C. | failed |
| 11.2° C. | failed |
| 11.7° C. | failed |

As can be seen from the table, all of the filtered samples collected below 11° C. passed the test, in that they were all clear (no precipitate). The remaining samples fail because precipitate was observed.

It will be understood that the embodiments hereinabove described are specific embodiments, and are in no way to be construed as being in any way limiting on the scope of the disclosure. The skilled person will readily be able to conceive of modifications, including the combination of embodiments or elements thereof, that lie within the scope of the disclosure. It should be understood that the embodiments described above are not only in the alternative, but can be combined.

We claim:

1. A method of dewaxing a citrus oil by subjecting the oil to a filtration process, in which the oil is caused to flow parallel to a porous membrane surface to produce a substantially wax-free citrus oil which passes the 48-hour chilled wax test with no precipitate observed following incubation at 4° C. for 48 hours, during which filtration process it is maintained at a temperature of less than about 11° C., said membrane having an average pore size of from about 0.05 to about 5 micrometers, wherein the incidence of failure due to incomplete removal of the wax increases sharply as the temperature of 11° C. is approached.

2. The method according to claim 1, in which the porous membrane is a membrane crossflow filter comprising a material of at least one of ceramic, metal, graphite or polymer.

3. The method according to claim 1, in which the membrane average pore size is between about 0.2 and about 3 micrometers.

4. The method according to claim 3, in which the membrane average pore size is between about 0.2 and about 1.4 micrometers.

5. The method according to claim 1, in which the flow of oil parallel to the membrane surface has a linear velocity of from about 1 to about 7 m/s.

6. The method according to claim 5, in which the membrane is polymeric and the linear velocity is from about 1 to about 2 m/s.

7. The method according to claim 5, in which the membrane is ceramic and the linear velocity is from about 4 to about 7 m/s.

* * * * *